United States Patent

Enomoto

[11] Patent Number: 5,548,446
[45] Date of Patent: Aug. 20, 1996

[54] LENS BODY TUBE WITH BUILT-IN CONVERTER LENS

[75] Inventor: Keiji Enomoto, Tokyo, Japan

[73] Assignee: Ricoh Company, Ltd., Tokyo, Japan

[21] Appl. No.: 177,398

[22] Filed: Jan. 5, 1994

[30] Foreign Application Priority Data

Jan. 13, 1993 [JP] Japan .................................. 5-021726

[51] Int. Cl.⁶ .................................................. G02B 15/14
[52] U.S. Cl. ........................ 359/695; 359/694; 359/700; 359/705
[58] Field of Search ..................... 359/695, 696, 359/698, 699, 700, 701, 704, 705; 354/195.12

[56] References Cited

U.S. PATENT DOCUMENTS

| | | | |
|---|---|---|---|
| 4,214,829 | 7/1980 | Ohashi | 354/197 |
| 4,525,050 | 6/1985 | Ohashi | 354/195.12 |
| 4,791,441 | 12/1988 | Nishi | 354/195.12 |
| 4,887,107 | 12/1989 | Nakamura | 354/195.12 |
| 5,086,312 | 2/1992 | Tanaka | 354/195.12 |
| 5,099,263 | 3/1992 | Matsumoto | 354/195.12 |
| 5,260,733 | 11/1993 | Kawano | 354/195.12 |
| 5,262,898 | 11/1993 | Nomura | 359/700 |

FOREIGN PATENT DOCUMENTS

| | | |
|---|---|---|
| 52-76919 | 6/1977 | Japan . |
| 59-67504 | 4/1984 | Japan . |
| 2-308210 | 12/1990 | Japan . |
| 2-308211 | 12/1990 | Japan . |
| 2-308212 | 12/1990 | Japan . |
| 2-308113 | 12/1990 | Japan . |
| 2-302711 | 12/1990 | Japan . |
| 3-6971 | 1/1991 | Japan . |
| 3-11312 | 1/1991 | Japan . |

*Primary Examiner*—Georgia Y. Epps
*Assistant Examiner*—Ricky Mack
*Attorney, Agent, or Firm*—Oblon, Spivak, McClelland, Maier & Neustadt, P.C.

[57] ABSTRACT

When rotational force of a zooming motor is transmitted to a driving gear, a main moving frame in a lens body tube is moved along an optical axis while the main moving frame is rotated. Thus, a moved frame is moved along the optical axis and a cam frame is rotated while the cam frame is moved along the optical axis. While a zooming optical system is moved from a wide angle position to a storing position, a moving frame for a second lens group is rotated by rotational force of the cam frame while the moving frame for the second lens group is moved along the optical axis. Further, a moving frame for a third lens group is moved along the optical axis while no moving frame for the third lens group is rotated. A converter lens is inserted into an optical path of an effective light beam from an escaping position by a relative rotating operation of these two moving frames. Accordingly, it is possible to provide an optical system having a super short focal length which cannot be obtained within a zooming region. When the cam frame is further rotated in the same direction, the lens body tube attains a storing state providing a shortest body tube length.

4 Claims, 7 Drawing Sheets

LENS BODY TUBE WITH BUILT-IN CONVERTER LENS

BACKGROUND OF THE INVENTION

1. Field of the Invention

The present invention relates to a lens body tube of a zooming optical system applicable to apparatuses and devices in various kinds of fields requiring the zooming optical system such as a normal camera using a silver salt film, a video camera, a projector, etc. More particularly, the present invention relates to a lens body tube having a zooming optical system in which a specified focal length unable to be obtained by only the zooming optical system can be realized by detachably attaching and inserting a converter lens into the zooming optical system to change its focal length while a plurality of lens groups are relatively moved on an optical axis of the zooming optical system.

2. Description of the Related Art

For example, each of Japanese Patent Application Laying Open (KOKAI) Nos. 2-302711, 2-308113, 2-308210, 2-308211, 2-308212, 3-6971 and 3-11312 shows a technique of a lens body tube with a built-in zooming optical system in which a specified focal length unable to be obtained by only the zooming optical system can be realized by detachably attaching and inserting a converter lens into the zooming optical system. This specified focal length is provided at a super wide angle or a super telescopic end.

However, in the technique of the lens body tube shown by each of these publications, it is often necessary to arrange a dedicated operating member used to take a super wide angle photograph or a super telescopic photograph in addition to an operating member such as a seesaw knob used to take a photograph in a zooming region. An electric driving means such as an electric motor and a solenoid for attaching and detaching the converter lens is separately required in addition to a driving means for zooming even when no dedicated operating member is required. Further, a special electric control means for attaching and detaching the converter lens is required when no dedicated operating member is required. Operability of the lens body tube is reduced by these problems. Otherwise, a structure of the lens body tube becomes complicated mainly by these problems.

In the technique shown in each of the above publications, the structure of a mechanical moving means for attaching and detaching the converter lens becomes complicated so that the structure of the lens body tube is further complicated.

Each of the above publications does not show any problems and techniques for reducing a length of the lens body tube when no lens body tube is used. Therefore, each of these publications cannot be used as a reference technique for obtaining a lens body tube reduced in length.

SUMMARY OF THE INVENTION

It is therefore a first object of the present invention to provide a lens body tube with a built-in converter lens as a built-in zooming optical system in which a specified focal length unable to be obtained within a zooming region of the zooming optical system can be realized by detachably attaching and inserting the converter lens into the zooming optical system to change its focal length while a plurality of lens groups are relatively moved on an optical axis of the zooming optical system. The first object is concretely to obtain by the following five advantages.

(i) Driving force of an electric motor for moving each of moving lens groups constituting the zooming optical system can be utilized as it is without using any dedicated electric driving means for applying driving force to the converter lens when the converter lens is attached and detached.

(ii) It is not necessary to especially arrange any complicated electric control means for attaching and detaching the converter lens.

(iii) A mechanical member arranged in a normal zoom lens is utilized as much as possible as a mechanical moving means when the converter lens is attached and detached. The structure of the lens body tube can be simplified and provided as a strong structure by adding some peculiar members to this mechanical member.

(iv) A diameter and a length of the lens body tube are not especially increased.

(v) No dedicated operating member is arranged when the specified focal length is realized and the body tube length is reduced. Further, the specified focal length can be realized by operations continuously connected to a normal zooming operation.

A second object of the present invention is to provide a lens body tube with a built-in converter lens as a built-in zooming optical system in which a specified focal length unable to be obtained within a zooming region of the zooming optical system can be realized by detachably attaching and inserting the converter lens into the zooming optical system to change its focal length while a plurality of lens groups are relatively moved on an optical axis of the zooming optical system, and a length of the lens body tube can be reduced when no lens body tube is used.

The above first object of the present invention can be achieved by a lens body tube with a built-in converter lens in which a specified focal length is obtained by detachably inserting the converter lens into a built-in zooming optical system to change its focal length while a plurality of lens groups are relatively moved on an optical axis of the zooming optical system;

the lens body tube comprising:

one lens group moving means for relatively moving the plural lens groups within the lens body tube or a device having this lens body tube;

the plural lens groups constituting the zooming optical system and including:

at least one rotating-moving lens group moved on the optical axis while the rotating-moving lens group is rotated around the optical axis when the lens group moving means is rotated in a predetermined direction; and a straight moving lens group straightly moved on the optical axis while no straight moving lens group is rotated when the lens group moving means is rotated in the predetermined direction;

the converter lens being able to be inserted into the zooming optical system from an escaping position to an acting position;

a length of the lens body tube being sequentially changed in an order of a first state length, a second state length, a third state length and a fourth state length;

the first state length being longest and providing a focal length of each of the plural lens groups at one end of a zooming region of the zooming optical system by rotating the lens group moving means in the predetermined direction;

the second state length being a second longest length and providing a focal length of each of the plural lens groups at the other end of the zooming region of the zooming optical system by subsequently rotating the lens group moving means;

the third state length being a third longest length set by subsequently rotating the lens group moving means; and the fourth state length being a shortest focal length set by subsequently rotating the lens group moving means;

the lens body tube being constructed such that the specified focal length unable to be obtained within the zooming region of the zooming optical system is obtained by detachably inserting the converter lens using a relative rotating movement caused between the rotating-moving lens group and the straight moving lens group in a process except for a changing process from the first state length to the second state length.

The above second object of the present invention can be achieved by a lens body tube with a built-in converter lens in which a specified focal length is obtained by detachably inserting the converter lens into a built-in zooming optical system to change its focal length while a plurality of lens groups are relatively moved on an optical axis of the zooming optical system;

the lens body tube being constructed such that one lens group moving means is arranged within the lens body tube or a device having the lens body tube;

the plural lens groups can be relatively moved by reciprocating the lens group moving means;

the plural lens groups constituting the zooming optical system can further approach each other by operating this lens group moving means in a constant direction in comparison with relative distances of the lens groups on the optical axis provided when the specified focal length is realized; and a length of the lens body tube at this time is set to a storing length of the lens body tube when no lens body tube is used.

In the above first lens body tube with the built-in converter lens, a specified focal length unable to be obtained within a zooming region of the zooming optical system is realized by detachably inserting the converter lens into the zooming optical system to change its focal length while the plural lens groups are relatively moved on the optical axis. The lens body tube has one lens group moving means for relatively moving the plural lens groups. The plural lens groups moved by this lens group moving means are divided into at least one rotating-moving lens group and a straight moving lens group. The rotating-moving lens group is moved on the optical axis while the rotating-moving lens group is rotated around the optical axis when the lens group moving means is rotated in a predetermined direction. When the lens group moving means is rotated in the predetermined direction, the straight moving lens group is straightly moved on the optical axis while no straight moving lens group is rotated.

When the specified focal length unable to be obtained within the normal zooming region of the zooming optical system is realized, a relative rotating movement is caused between the rotating-moving lens group and the straight moving lens group by using an operation of the lens group moving means set on an extension of an operation of the lens group moving means for realizing a focal length in the zooming region. The converter lens is inserted into a predetermined position of the zooming optical system by this relative rotating movement so as to obtain the specified focal length.

In the second lens body tube with the built-in converter lens, a specified focal length unable to be obtained within a zooming region of the zooming optical system is realized by detachably inserting the converter lens into the zooming optical system to change its focal length while the plural lens groups are relatively moved on the optical axis.

This lens body tube is constructed such that a length of the lens body tube can be reduced to a length providing a storing state. Further, a position for detachably inserting the converter lens is set to an arbitrary position between one limit position in the normal zooming region of the zooming optical system and a position for providing the body tube length in the storing state of the lens body tube.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a lens body tube with a built-in converter lens in the present invention will next be described in detail with reference to the accompanying drawings.

Figure 1:
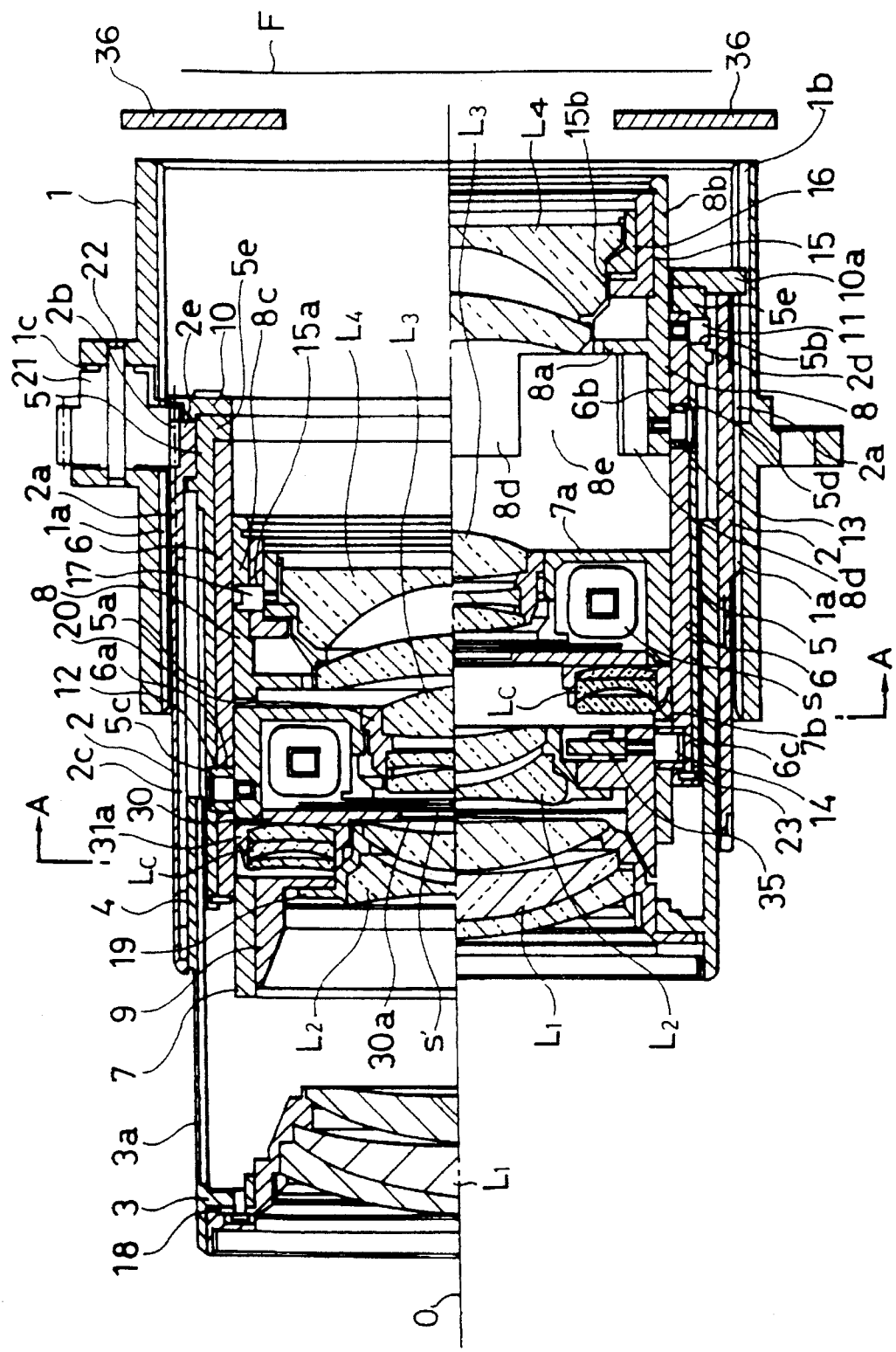
FIG. 1 is a cross-sectional view of a lens body tube with a built-in converter lens in accordance with one embodiment of the present invention in which an upper portion of FIG. 1 located above a central line as an optical axis O is a cross-sectional view of the lens body tube when a zooming optical system is set in a long focal length state as a telescopic state; and a lower portion of FIG. 1 located below the central line is a cross-sectional view of the lens body tube when the zooming optical system is set in a short focal length state as a wide angle state.

FIG. 1 is a cross-sectional view of a lens body tube with a built-in converter lens in accordance with one embodiment of the present invention. An upper portion of FIG. 1 located above a central line as an optical axis O is a cross-sectional view of the lens body tube when a zooming optical system is set in a long focal length state as a telescopic state. A lower portion of FIG. 1 located below the central line is a cross-sectional view of the lens body tube when the zooming optical system is set in a short focal length state as a wide angle state.

Figure 2:
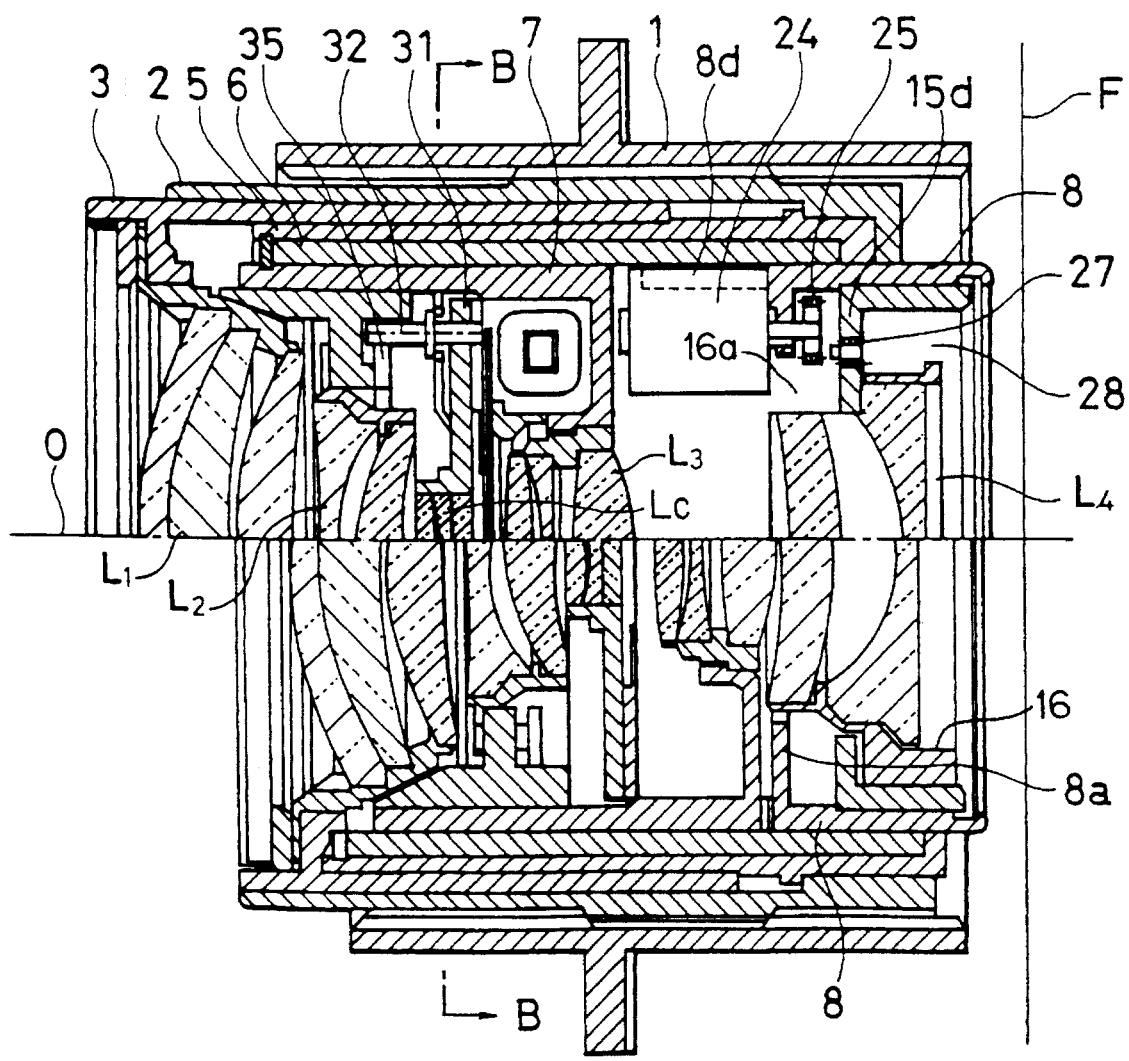
FIG. 2 is another cross-sectional view of the lens body tube with the built-in converter lens in the present invention in which an upper portion of FIG. 2 located above a central line is a cross-sectional view of the lens body tube when the zooming optical system is set in a super short focal length state as a super wide (S-WIDE) angle state unable to be obtained within a zooming region of this zooming optical system; and a lower portion of FIG. 2 located below the central line is a cross-sectional view of the lens body tube set in a storing state in which no lens body tube is used.

FIG. 2 is another cross-sectional view of the lens body tube with the built-in converter lens in the present invention. An upper portion of FIG. 2 located above a central line is a cross-sectional view of the lens body tube when the zooming optical system is set in a super short focal length state as a super wide (S-WIDE) angle state unable to be obtained within a zooming region of this zooming optical system. A lower portion of FIG. 2 located below the central line is a cross-sectional view of the lens body tube set in a storing state in which no lens body tube is used.

Figure 3:
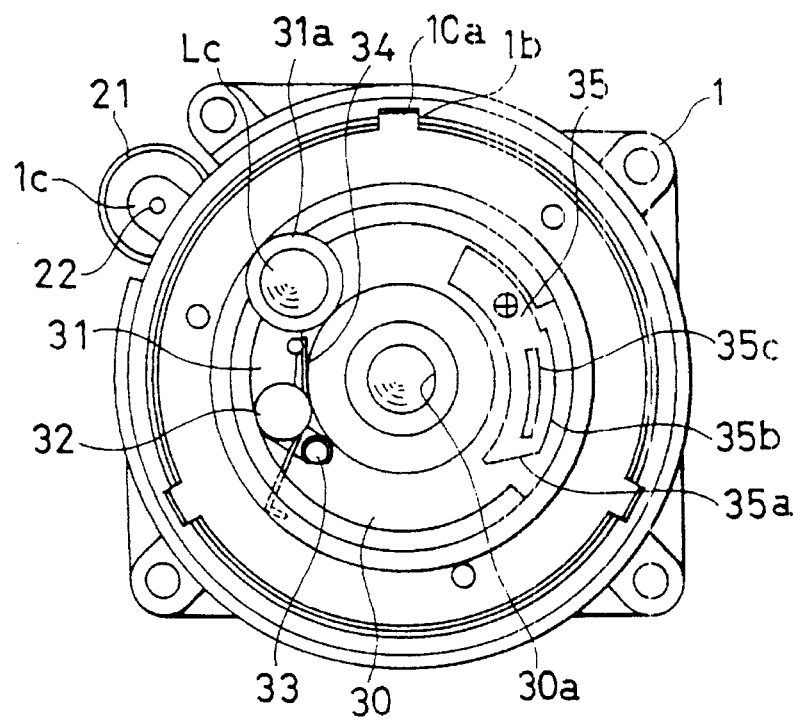
FIG. 3 is a cross-sectional view of the lens body tube taken along line A—A of FIG. 1 and showing a state in which the converter lens is located in an escaping position.
Figure 4:
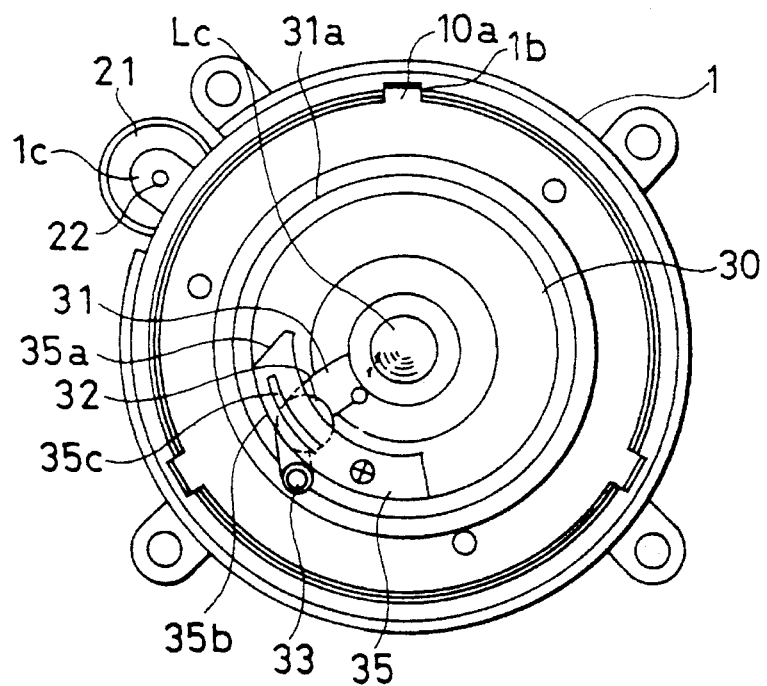
FIG. 4 is a cross-sectional view of the lens body tube taken along line B—B of FIG. 2 and showing a state in which the converter lens is inserted into the zooming optical system and is located in an acting position of the zooming optical system.

FIG. 3 is a cross-sectional view of the lens body tube taken along line A—A of FIG. 1 and showing a state in which the converter lens is located in an escaping position. FIG. 4 is a cross-sectional view of the lens body tube taken along line B—B of FIG. 2 and showing a state in which the converter lens is inserted into the zooming optical system and is located in an acting position of the zooming optical system.

In FIGS. 1 to 4, for example, the zooming optical system built in the lens body tube is constructed by four lens groups composed of a first lens group $L_1$, a second lens group $L_2$, a third lens group $L_3$ and a fourth lens group $L_4$ sequentially arranged from the side of a photographed object.

In this case, the first lens group $L_1$ is constructed by two lens groups of three lenses. The second lens group $L_2$ is constructed by two lens groups of two lenses. The third lens group $L_3$ is constructed by three lens groups of three lenses.

The fourth lens group $L_4$ is constructed by two lens groups of two lenses. An upper portion of the fourth lens group $L_4$ is formed in an upper half portion of FIG. 2 and is partially cut in an arc shape as shown by an upper cross-sectional view located above a central line of FIG. 2. Gear series means 25 to 27 for focusing described later are arranged in a spatial portion of the lens body tube formed by the partially cut portion of the fourth lens group.

An effective light beam passes through the fourth lens group $L_4$ and is transmitted in a short side direction of the screen of a 35 mm film as a film width direction. This effective light beam passes a position which is not so high from the optical axis O. Accordingly, when the fourth lens group $L_4$ is seen on a plane, no light beam for taking a photograph is used in a shallow semicircular or arc region formed in a position equal to or higher than a predetermined height.

Therefore, if front and rear lenses of the fourth lens group $L_4$ are cut on faces parallel to the optical axis O at respective predetermined heights, each of the front and rear lenses is formed as a deforming lens having planar and super semicircular shapes providing a flat upper portion. A portion of each of the front and rear lenses corresponding to the shallow semicircular region is formed as a spatial portion.

In this case, the rear lens is located in a position near a film face F. Accordingly, the height of the effective light beam passing through the rear lens from the optical axis O is higher than the height of the effective light beam passing through the front lens from the optical axis O. Therefore, the spatial portion 16a is formed by a two-step structure providing a step difference in a portion near the optical axis O.

Figure 9:
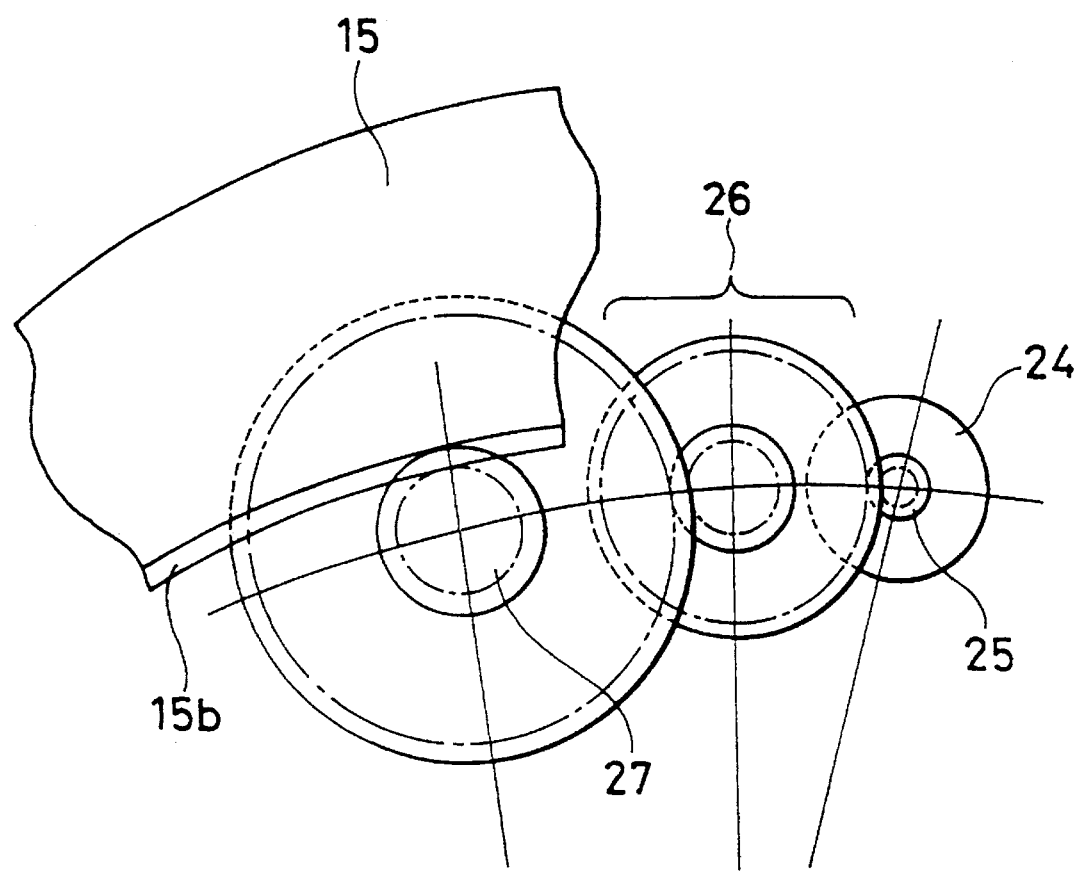
FIG. 9 is a rear view for showing a gear series means from an output gear of a focusing motor to a final stage gear engaged with a focus ring inner gear portion.

This spatial portion can be used as a storing spatial portion 28 for arranging various kinds of mechanical members. As shown in FIG. 9, gear series means 25 to 27 for focusing are arranged from an output gear 25 of a focusing motor 24 to a small gear 27 at a final stage through a suitable reduction gear series 26. An upper portion of the fourth lens group $L_4$ is cut such that the gear series means 25 to 27 can be stored or housed into this storing spatial portion 28.

Figure 5:
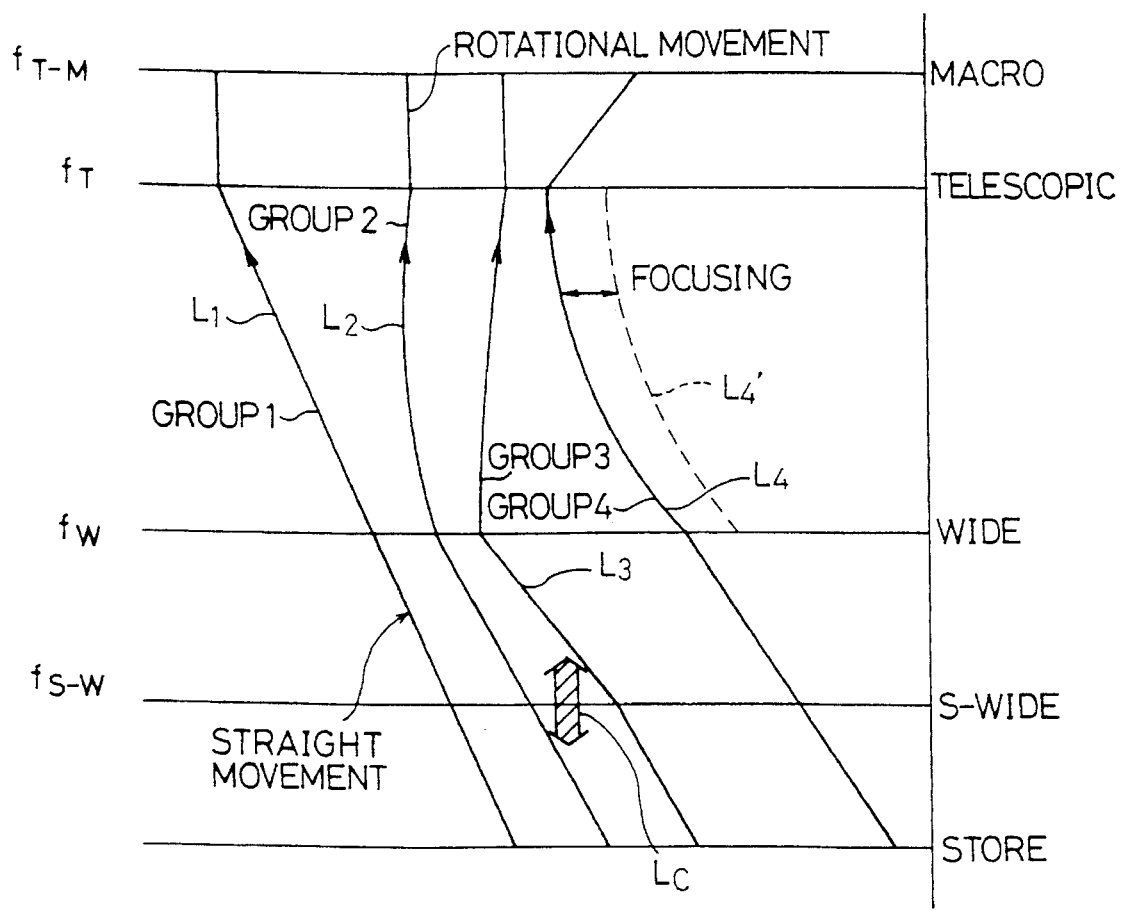
FIG. 5 is a view of a zooming action showing relative moving loci of four lens groups $L_1$ to $L_4$ constituting the zooming optical system in relation to their focal lengths when the four lens groups $L_1$ to $L_4$ are zoomed.

When the four lens groups $L_1$ to $L_4$ are zoomed, these four lens groups are relatively moved on the optical axis O along relative moving loci as shown in FIG. 5. For example, the zooming optical system is optically designed such that a focal length of the zooming optical system can be continuously changed by the relative movements within a zooming region of the zooming optical system from a long focal length $f_T$ to a short focal length $f_W$. Further, the zooming optical system is optically designed such that a focal length $f_{T-M}$ longer than the long focal length $f_T$ can be obtained by relatively moving the four lens groups to predetermined positions to extend the zooming region on a side of the long focal length $f_T$. The longer focal length $f_{T-M}$ is a focal length at a macroscopic time of the zooming optical system.

For example, a shutter unit S of an electromagnetic driving type is located in an intermediate position between the second lens group $L_2$ and the third lens group $L_3$. The shutter unit S has a shutter blade S' which also functions as a diaphragm. No shutter unit S constitutes features of the present invention and an explanation of the shutter unit S is therefore omitted in the following description.

In the lens body tube shown each of FIGS. 1 to 4, a converter lens Lc is arranged between the second lens group $L_2$ and the third lens group $L_3$ of the zooming optical system. The converter lens Lc is arranged to realize a specified focal length such as a super short focal length $f_{S-W}$ which cannot be obtained within the zooming region of the zooming optical system having the lens groups $L_1$ to $L_4$.

In this case, as described later, the converter lens Lc is located in an escaping position shown in FIG. 1 and dislocated from an optical path of the effective light beam in the zooming optical system when the lens body tube is set to have a length for realizing the zooming region of the zooming optical system having the lens groups $L_1$ to $L_4$. Namely, the converter lens Lc is located in the escaping position when the lens groups $L_1$ to $L_4$ realize a focal length of the zooming optical system within the zooming region. The converter lens Lc is located in a predetermined acting position shown in FIG. 2 and set in advance on the optical axis O when the lens body tube is set to have a length providing a focal length state exceeding the zooming region of the zooming optical system $L_1$ to $L_4$. Namely, the converter lens Lc is located in the predetermined acting position when an operating region of the zooming optical system $L_1$ to $L_4$ is located outside the zooming region.

In the following description, the long focal length $f_T$ is called a focal length $f_T$ at a telescopic end of the zooming optical system. The focal length $f_{T-M}$ longer than this focal length $f_T$ at the telescopic end is called a focal length $f_{T-M}$ at a macroscopic time of the zooming optical system. The short focal length $f_W$ is called a focal length $f_W$ at a wide angle end of the zooming optical system. The super short focal length $f_{S-W}$ is called a focal length $f_{S-W}$ at a super wide (S-WIDE) angle end of the zooming optical system.

The construction of the lens body tube having the lens groups $L_1$ to $L_4$ of the zooming optical system and the built-in converter lens Lc will next be explained.

In FIG. 1, a fixed ring 1 is fixed to an apparatus or a device such as a camera requiring the zooming optical system. For example, a plurality of female helicoidal screws 1a are formed in a stripe shape on an inner circumferential face of the fixed ring 1 on the side of a photographed object. The female helicoidal screws 1a are arranged to move a main moving frame 2 described later forward and backward along an optical axis O while the main moving frame 2 is rotated.

As shown in FIGS. 3 and 4, for example, three straight guide grooves 1b are formed on the inner circumferential face of the fixed ring 1 on the side of a film face F to straightly move a connecting ring 10 described later forward and backward along the optical axis O. Further, a notch portion 1c for attaching a driving gear 21 described later is formed in a portion of a flange formed in an intermediate portion of the fixed ring 1.

Figure 6:
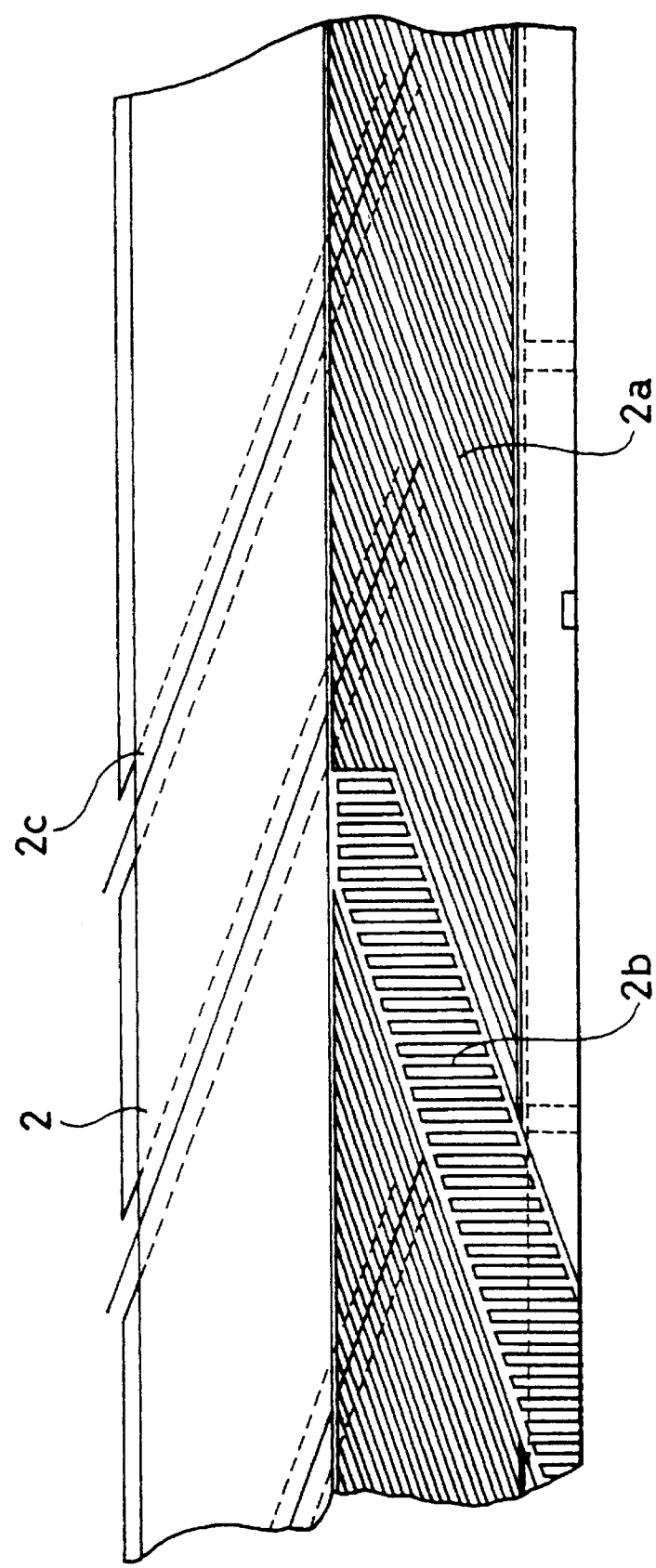
FIG. 6 is a developed view showing shapes and arranging relations of a male helicoidal screw, a gear portion and a lead groove formed on an outer circumferential face of a main moving frame.

The main moving frame 2 is arranged between an inner side portion of the fixed ring 1 and an outside portion of a guide ring 5 described later such that the main moving frame 2 can be relatively rotated with respect to both the rings 1 and 5. As shown in FIG. 6, a male helicoidal screw 2a is formed in a predetermined range of an outer circumferential face of the main moving frame 2 and is precisely screwed into each of the female helicoidal screws 1a of the fixed ring 1. A gear portion 2b is formed in a rear end portion of the main moving frame 2 on its outer circumferential face and is engaged with a driving gear 21.

In this case, as shown in FIG. 6, the gear portion 2b is formed in a spiral shape such that the gear portion 2b has a predetermined length in a direction of the optical axis O so as to move the main moving frame 2 while the main moving frame 2 is rotated in a predetermined range in the direction of the optical axis O. This predetermined length of the gear portion 2b in the optical axis direction will be explained in detail in an item of "operations and actions" of the lens body tube described later.

A plurality of lead grooves 2c and a predetermined number of connecting grooves 2d are formed on the inner circumferential face of the main moving frame 2 to move a moved frame 3 described later forward and backward along the optical axis O.

Further, an internal flange portion 2e as a step portion is formed in a rear end portion of the main moving frame 2. The internal flange portion 2e can be relatively rotated with respect to both the rings 5 and 10 between a flange portion of the guide ring 5 and an outer circumferential end face of the connecting ring 10 on the side of a photographed object. Further, the internal flange portion 2e is supported in a state in which no internal flange portion 2e can be relatively moved with respect to the rings 5 and 10 in the direction of the optical axis O.

The moved frame 3 is arranged in an inside portion of the main moving frame 2 such that the moved frame 3 can be moved and extended forward and backward along the optical axis O. A key groove 3a is formed on an inner circumferential face of the moved frame 3 to straightly move the moved frame 3 while no moved frame 3 is rotated. This moved frame 3 functions as a moving frame for moving the first lens group $L_1$ along the optical axis O.

An engaging piece 4 is attached onto an outer circumferential face of the moved frame 3. The engaging piece 4 is precisely fitted into each of the lead grooves 2c of the main moving frame 2. This engaging piece 4 is used to move the moved frame 3 forward and backward along the optical axis O in cooperation with the lead grooves 2c when the main moving frame 2 is rotated in normal and reverse directions.

The guide ring 5 is arranged in inner side portions of the main moving frame 2 and the moved frame 3. A key portion 5a is formed on an outer circumferential face of the guide ring 5 and is fitted into the key groove 3a of the moved frame 3.

This guide ring 5 is fixed such that a rear end portion of the guide ring 5 is integrated with the connecting ring 10 described later. The relation of the guide ring 5, the connecting ring 10 and the fixed ring 1 will be described later. Further, one arc directional groove 5b and two straight grooves 5c and 5d are formed in a circumferential wall portion of the guide ring 5. A flange portion 5e is formed in the rear end portion of the guide ring 5.

A cam frame 6 is fitted onto an inner circumferential face of the guide ring 5 such that the cam frame 6 can be relatively rotated with respect to the guide ring 5. The cam frame 6 can be integrally moved in the optical axis direction together with the guide ring 5 by a snap ring 23 and an inner face of the flange portion 5e of the guide ring 5. The snap ring 23 is fitted and attached to an end tip portion of the guide ring 5.

A connecting pin 11 is attached to a portion of the cam frame 6 near a rear end thereof. This connecting pin 11 is simultaneously fitted to the arc directional groove 5b of the guide ring 5 and the connecting grooves 2d of the main moving frame 2 so that the connecting pin 11 can be integrally rotated together with the main moving frame 2.

Figure 7:
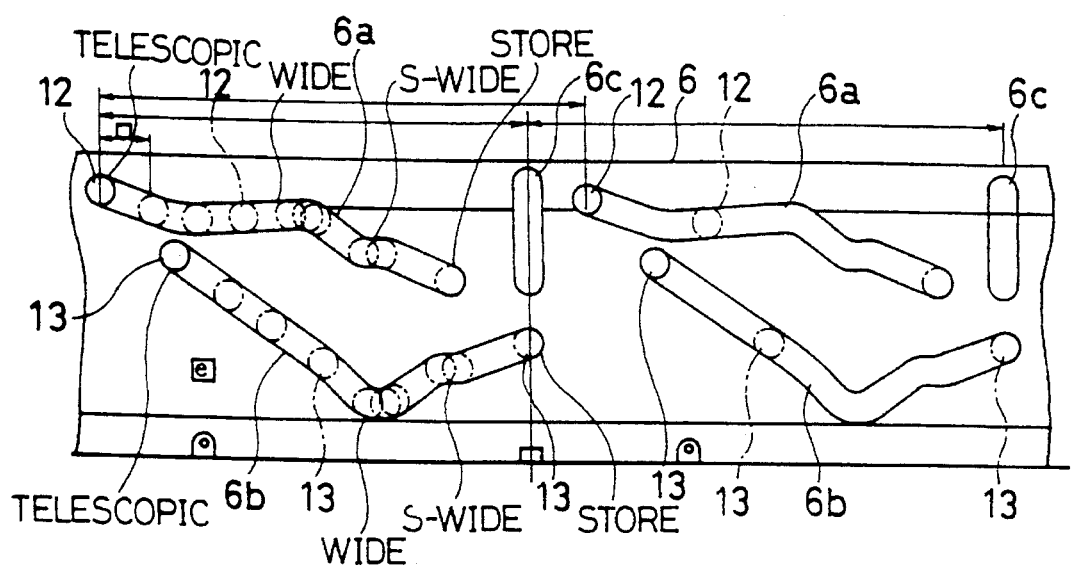
FIG. 7 is a developed view showing shapes and arranging relations of a cam groove for moving a third lens group, a cam groove for moving a fourth lens group and an arc directional groove formed in a circumferential wall portion of a cam frame.

As shown in FIG. 7, a cam groove 6a for moving the third lens group, a cam groove 6b for moving the fourth lens group and a straight groove 6c are formed in a circumferential wall portion of the cam frame 6. The cam groove 6a for moving the third lens group and the cam groove 6b for moving the fourth lens group will be explained in detail in the item of "operations and actions" of the lens body tube described later. A moving frame 7 for the third lens group is fitted onto an inner circumferential face of the cam frame 6 in a front portion thereof (see FIG. 8). A right-hand portion of the moving frame 7 in FIG. 8 is formed as a hollow end face wall portion 7a (see FIG. 1).

An unillustrated leg portion receiving region is formed in each of three regions of the end face wall portion 7a opposite to leg portions 8d formed in three portions of a moving frame 8 for the fourth lens group described later. The leg portion receiving region has a shape able to receive each of the leg portions 8d transversally formed in the moving frame 8 for the fourth lens group when the moving frame 7 for the third lens group and the moving frame 8 for the fourth lens group are relatively moved straightly on the optical axis O in an approaching direction. Namely, the leg portion receiving region has a shape able to receive each of the leg portions 8d when a distance between the moving frame 7 for the third lens group and the moving frame 8 for the fourth lens group is set as shown by a lower cross-sectional view located below the central line of FIG. 2. An unillustrated motor receiving region is formed in one region opposite to a focusing motor 24 described later. The motor receiving region has a shape able to receive a tail portion of the focusing motor 24 when the moving frame 7 for the third lens group and the moving frame 8 for the fourth lens group are relatively moved straightly on the optical axis O in the approaching direction. Namely, the motor receiving region has a shape able to receive the tail portion of the focusing motor 24 when the distance between the moving frame 7 for the third lens group and the moving frame 8 for the fourth lens group is set as shown by the lower cross-sectional view located below the central line of FIG. 2.

A fitting roller 12 is arranged on an outer circumferential face of the moving frame 7 for the third lens group. A plurality of pins are spaced from each other at an equal distance and are fitted into the fitting roller 12. This fitting roller 12 is fitted into the cam groove 6a for moving the third lens group formed in the circumferential wall portion of the cam frame 6 and is simultaneously fitted into the front straight groove 5c formed in the circumferential wall portion of the guide ring 5. When the cam frame 6 is rotated, the moving frame 7 for the third lens group can be moved in the optical axis direction in a state in which no moving frame 7 is rotated.

Figure 8:
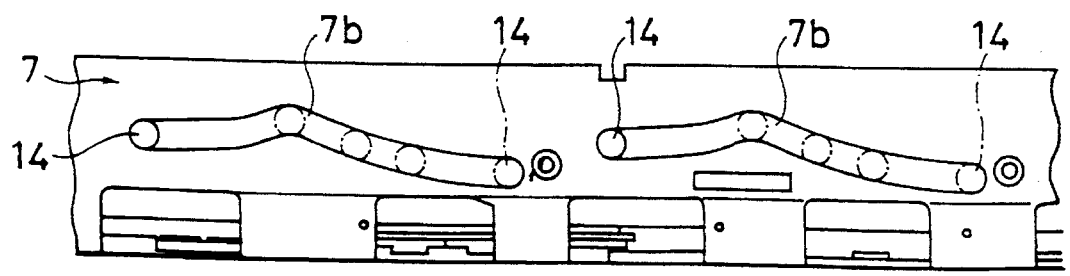
FIG. 8 is a developed view showing a shape and an arranging relation of a cam groove for moving a second lens group formed in a circumferential wall portion of a moving frame for the third lens group.

As shown in FIG. 8, a cam groove 7b for moving the second lens group is formed in a circumferential wall portion of the moving frame 7 for the third lens group to move a moving frame 9 for the second lens group described later in the optical axis direction while this moving frame 9 is rotated. This cam groove 7b for moving the second lens group will be explained in detail in items of the moving frame 9 for the second lens group and "operations and actions" of the lens body tube described later.

The moving frame 8 for the fourth lens group is fitted onto an inner circumferential face of the cam frame 6 in a rear portion thereof. The moving frame 8 is constructed as follows in relation to relative movements of the moving frame 7 for the third lens group and a holding frame 16 of the fourth lens group described later.

First, a portion of the moving frame 8 on the side of the film face F with respect to an inner flange portion 8a located in a central portion of FIG. 2 is formed as a cylindrical portion 8b (see FIG. 1). A straight groove 8c is formed on an inner circumferential face of the cylindrical portion 8b. A connecting pin 17 is attached to the holding frame 16 of the fourth lens group and is fitted into the straight groove 8c.

The plural transversal leg portions 8d are projected on the side of a photographed object with respect to the inner flange portion 8a of the moving frame 8 for the fourth lens group. The plural transversal leg portions 8d are composed of at least three transversal leg portions formed in at least three portions of the moving frame 8. Outer circumferential faces of the plural leg portions 8d are fitted onto the inner circumferential face of the cam frame 6 such that the leg portions 8d can be straightly moved and slid forward and backward along the optical axis O and the cam frame 6 can be relatively rotated with respect to the moving frame 8 for the fourth lens group.

The plural leg portions 8d are spaced from each other at unequal pitches in this embodiment. One of plural spatial portions 8e formed between the leg portions 8d is used as a space for storing the focusing motor 24 with an output gear described later.

Two adjacent moving lens frames approach each other by a crossing structure until a smallest clearance therebetween. These two adjacent moving lens frames are composed of the moving frame 7 for the third lens group and the moving frame 8 for the fourth lens group in this embodiment. In the crossing structure, both the adjacent moving lens frames cross each other as if fingers of both hands were combined with each other. This crossing structure is already known as a structure of the zoom lens body tube. Accordingly, detailed picture and explanation of the crossing structure are omitted in the following description.

A fitting roller 13 is arranged on an outer circumferential face of the moving frame 8 for the fourth lens group. A plurality of pins are spaced from each other at an equal distance and are fitted to the fitting roller 13. This fitting roller 13 is fitted into the cam groove 6b for moving the fourth lens group formed in the circumferential wall portion of the cam frame 6 and is simultaneously fitted into the rear straight groove 5d formed in the circumferential wall portion of the guide ring 5. When the cam frame 6 is rotated, similar to the moving frame 7 for the third lens group, the moving frame 8 for the fourth lens group can be moved in the optical axis direction in a state in which no moving frame 8 is rotated.

As mentioned above, the moving frame 9 for the second lens group is fitted onto an inner circumferential face of the moving frame 7 for the third lens group such that the moving frame 9 can be moved in the optical axis direction and can be relatively rotated with respect to the moving frame 7 for the third lens group. A plurality of fitting rollers 14 are spaced from each other at an equal distance on an outer circumferential face of the moving frame 9 for the second lens group.

Each of the fitting rollers 14 is fitted into the cam groove 7b for moving the second lens group formed in the circumferential wall portion of the moving frame 7 for the third lens group and is also fitted into the straight groove 6c formed in the circumferential wall portion of the cam frame 6. When the cam frame 6 is rotated and moved in the optical axis direction, the moving frame 9 for the second lens group is moved by a moving amount of the cam frame 6 together with this cam frame 6 in the optical axis direction. Further, the moving frame 9 is rotated with respect to the moving frame 7 for the third lens group by the cam groove 7b for moving the second lens group in the moving frame 7 for the third lens group in a process of the movement in the optical axis direction.

Namely, when the cam frame 6 is rotated, the moving frame 9 can be moved together with the cam frame 6 in the optical axis direction while the moving frame 9 is rotated with respect to the moving frame 7 for the third lens group.

The connecting ring 10 is fixedly attached to a rear end portion of the guide ring 5. The connecting ring 10 has a connecting-projecting portion 10a in an outer circumferential portion thereof. The connecting-projecting portion 10a is fitted into each of the straight guide grooves 1b of the fixed ring 1.

Therefore, the guide ring 5 and the connecting ring 10 are connected to the fixed ring 1 in a state in which the guide ring 5 and the connecting ring 10 can be moved in the optical axis direction, but are not rotated around the optical axis O.

The above-mentioned focusing ring 15 is rotatably fitted onto an inner circumferential face of the moving frame 8 for the fourth lens group. A focusing cam groove 15a is formed in a circumferential wall portion of the focusing ring 15 to move the holding frame 16 of the fourth lens group described later along the optical axis O at a focusing time of the zooming optical system. An inner gear portion 15b is formed on an inner circumferential face of a flange portion of the focusing ring 15 and is engaged with a small gear 27 described later and finally rotated by the focusing motor 24.

The holding frame 16 holds the fourth lens group $L_4$ and is fitted onto an inner circumferential face of the focusing ring 15 such that the holding frame 16 can be moved in the optical axis direction. As shown by the upper cross-sectional view located above the central line of FIG. 2, the holding frame 16 of the fourth lens group is formed in a planar shape approximately conformed to that of each of front and rear lenses within the fourth lens group $L_4$.

Namely, similar to the front and rear lenses of the fourth lens group $L_4$, the holding frame 16 is cut in parallel with the optical axis O at a predetermined height from the optical axis O. As a result, the holding frame 16 of the fourth lens group has a planar shape in which a character C is directed upward. The fourth lens group $L_4$ having a super semicircular shape is fixedly held by the holding frame 16 of the fourth lens group formed in the planar shape of the upward directed character C.

The connecting pin 17 is attached onto an outer circumferential face of the holding frame 16 of the fourth lens group. This connecting pin 17 is simultaneously fitted into the focusing cam groove 15a of the focusing ring 15 and the straight groove 8c of the moving frame 8 for the fourth lens group. When the focusing ring 15 is rotated, the holding frame 16 of the fourth lens group can be moved by the connecting pin 17 forward and backward along the optical axis O while no holding frame 16 is rotated.

A holding frame 18 holds the first lens group $L_1$ and is fixed to an inner end tip portion of the moved frame 3. A holding frame 19 holds the second lens group $L_2$ and is fixed to the interior of the moving frame 9 for the second lens group. A holding frame 20 holds the third lens group $L_3$ and is fixed to the interior of the moving frame 7 for the third lens group.

A driving gear 21 is pivotally supported by a supporting shaft 22 attached to the notch portion 1c of the fixed ring 1. The driving gear 21 is engaged with an output gear of an unillustrated zooming motor such as a pulse motor through an unillustrated suitable reduction gear series. The zooming motor is arranged on the side of a camera or the lens body tube and can be rotated in normal and reverse directions.

In FIG. 2, the focusing motor 24 is used to move the holding frame 16 and the fourth lens group $L_4$ forward and backward along the optical axis O at a focusing time of the zooming optical system. As shown by the upper-cross sectional view located above the central line of FIG. 2, the focusing motor 24 is attached onto an end face of the inner flange portion 8a of the moving frame 8 for the fourth lens group on the side of a photographed object such that an output shaft of the focusing motor 24 is projected on the side of the film face F through the inner flange portion 8a of the moving frame 8 for the fourth lens group. For example, this focusing motor 24 is constructed by a pulse motor rotating in normal and reverse directions.

An output gear 25 is fixed to the output shaft of the focusing motor 24. As shown in FIG. 9, the output gear 25 is connected to the small gear 27 at a final stage engaged with the inner gear portion 15b of the focusing ring 15 through a suitable reduction gear series 26.

Reference numeral 30 designates a ground plate 30 of the above-mentioned shutter unit S. A light beam transmitting hole 30a is formed in a portion of the ground plate 30 corresponding to the optical path of an effective light beam in the zooming optical system (see FIG. 1). This ground plate 30 is fixedly arranged between the holding frame 20 of the third lens group and the holding frame 19 of the second lens group within the moving frame 7 for the third lens group. Namely, the ground plate 30 is fixedly arranged between the holding frame 20 of the third lens group and the moving frame 9 for the second lens group.

A converter lens arm 31 is arranged to move the converter lens Lc between the escaping position dislocated from the optical path of the effective light beam in the zooming optical system and the acting position on the optical axis O such that the converter lens can be attached and detached from the lens body tube. The escaping position is shown in FIG. 3 and the acting position is shown in FIG. 4. The converter lens arm 31 is pivotally supported by a pivotal shaft 32 on a rear face of the ground plate 30 (see FIG. 2). This rear face of the ground plate 30 is located on a side opposite to the shutter blade S' which also functions as a diaphragm. Further, the converter lens arm 31 has a frame body 31a for holding the converter lens Lc. The frame body 31a is formed in one end portion of the converter lens arm 31. An acting pin 33 for rotating the converter lens arm 31 is attached to another end portion of the converter lens arm 31.

In this case, the escaping position of the converter lens Lc is determined by a position of the converter lens Lc provided when the frame body 31a of the converter lens arm 31 comes in contact with an inner circumferential wall face of the moving frame 7 for the third lens group. The acting position of the converter lens Lc is determined by a position of the converter lens Lc provided when the acting pin 33 is held in a predetermined position of an arc cam 35b of a S-WIDE switching piece 35 described later. This predetermined position of the arc cam 35b is a position for setting the converter lens arm 31 to an acting posture described later.

In the following description, an escaping posture of the converter lens arm 31 is set to a posture provided when the converter lens Lc is located in the escaping position. An acting posture of the converter lens arm 31 is set to a posture provided when the converter lens Lc is located in the acting position.

In FIG. 3, a return spring 34 is wound around the pivotal shaft 32 to bias the converter lens arm 31 at any time in the counterclockwise direction. One end of the return spring 34 is pressed against an inner circumferential wall of the moving frame 7 for the third lens group. The other end of the return spring 34 is engaged with one arm portion of the converter lens arm 31. As a result, when the converter lens arm 31 is set to a free state, the return spring 34 biases and sets the converter lens arm 31 to the escaping posture.

The S-WIDE switching piece 35 has an arc shape and switches the converter lens arm 31 from the escaping posture to the acting posture. The S-WIDE switching piece 35 is fixedly attached to an end face portion of the moving frame 9 for the second lens group on the side of the film face F.

This S-WIDE switching piece 35 has a bevel cam 35a in one end portion thereof. The bevel cam 35a is engaged with the acting pin 33 of the converter lens arm 31. The S-WIDE switching piece 35 also has an arc cam 35b for holding the acting pin 33 in a predetermined position. The arc cam 35b is formed on an outer circumferential arc side face of the S-WIDE switching piece 35. The S-WIDE switching piece 35 further has a slit 35c for giving slight resilient property to the arc cam 35b.

When the moving frame 9 for the second lens group is relatively rotated with respect to the moving frame 7 for the third lens group and the ground plate 30 by a zooming operation for changing a focal length of the zooming optical system from a focal length $f_T$ at a telescopic end to a focal length $f_W$ at a wide angle end, the bevel cam 35a of the S-WIDE switching piece 35 pushes the acting pin 33 upward so that the converter lens arm 31 is pushed and rotated around the pivotal shaft 32. Thereafter, the arc cam 35b of the S-WIDE switching piece 35 holds the acting pin 33 in a predetermined position so that the converter lens arm 31 can be held in the acting posture.

The relation in relative position between the converter lens arm 31 and the S-WIDE switching piece 35 will be described in detail in the item of "operations and actions" of the lens body tube described later.

The above lens body tube has a suitable general control circuit means, a suitable zooming motor driving circuit means, a suitable focusing motor driving circuit means, a suitable automatic focusing control means, a seesaw type zooming-operating member, etc. on a lens body tube side or a camera side although these means, etc. are not illustrated in the drawings. The general control circuit means controls an entire operation of the lens body tube or the camera in addition to moving control of each of the lens frames such as the moving frames and the holding frames. The zooming motor driving circuit means drives the zooming motor. The focusing motor driving circuit means drives the focusing motor 24.

Operations and actions of the lens body tube in this embodiment will next be described every using mode. In the following description, a normal rotating direction of the zooming motor, etc. is set to a direction in which each of the lens groups $L_1$ to $L_4$ is moved from a position in a telescopic region of the zooming optical system to a position in a wide angle region of the zooming optical system. A reverse rotating direction of the zoom motor, etc. is set to a direction in which each of the lens groups $L_1$ to $L_4$ is reversely moved.

[Operations and actions for changing focal lengths within the zooming region $f_T$ to $f_W$]

When the lens body tube is set to an operating state shown by an upper cross-sectional view located above a central line of FIG. 1, the lens groups $L_1$ to $L_4$ of the zooming optical system are located in positions for realizing the focal length $f_T$ at the telescopic end.

In this state, when an unillustrated seesaw type zooming-operating member is operated in a normal direction for moving each of the lens groups $L_1$ to $L_4$ from the telescopic region to the wide angle region, the general control circuit means gives control commands for rotating the unillustrated zooming motor in a certain rotating direction such as the normal rotating direction to the zooming motor driving circuit means. Thus, the zooming motor is rotated in the normal rotating direction.

When the zooming motor is rotated in the normal rotating direction, rotational force of the zooming motor is transmitted to the driving gear 21 through the output gear and the reduction gear series. The rotational force of the zooming motor is further transmitted to the main moving frame 2 through its gear portion 2b. Accordingly, while the main moving frame 2 is rotated with respect to the fixed ring 1 in the normal rotating direction by a screwing action of a male helicoidal screw 2a of the main moving frame 2 and a female helicoidal screw 1a of the fixed ring 1, the main moving frame 2 is moved on the optical axis O in a rightward direction from a position shown by the upper cross-sectional view located above the central line of FIG. 1 to a position shown by a lower cross-sectional view located below the central line of FIG. 1.

When the main moving frame 2 is thus moved in the rightward direction while the main moving frame 2 is rotated, the connecting ring 10 and the guide ring 5 arranged inside the main moving frame 2 are moved together with the main moving frame 2 in the rightward direction.

This is because the inner flange portion 2e of the main moving frame 2 is supported between a flange portion of the guide ring 5 and an outer circumferential end face of the connecting ring 10 in a state in which the internal flange portion 2e can be relatively rotated and is integrally moved together with the main moving frame 2 in the direction of the optical axis O.

At this time, the guide ring 5 and the connecting ring 10 are integrally constructed. Further, the connecting-projecting portion 10a of the connecting ring 10 is fitted into a straight guide groove 1b of the fixed ring 1. Therefore, the guide ring 5 and the connecting ring 10 are moved in the rightward direction by an antirotation action and a straight guide action of the connecting-projecting portion 10a and the straight guide groove 1b in a state in which the guide ring 5 and the connecting ring 10 are not rotated.

When the main moving frame 2 is moved in the rightward direction while the main moving frame 2 is rotated, the moved frame 3 arranged between the main moving frame 2 and the guide ring 5 is straightly moved on the optical axis O in the rightward direction from a position shown by the upper cross-sectional view located above the central line of FIG. 1 to a position shown by the lower cross-sectional view located below the central line of FIG. 1.

The above straight movement of the moved frame 3 is provided by a leading action which is caused by the engaging piece 4 fixed onto an outer circumferential face of the moved frame 3 and is caused by the lead grooves 2c formed on an inner circumferential face of the main moving frame 2. The above straight movement of the moved frame 3 is also provided by an antirotation action and a straight guide action which are caused by the key groove 3a formed on an inner circumferential face of the moved frame 3 and are caused by the straight key portion 5a formed in the guide ring 5 in an unrotating state.

The cam frame 6 is supported between the flange portion 5e of the guide ring 5 and the snap ring 23. When the main moving frame 2 is moved in the rightward direction while the main moving frame 2 is rotated, the cam frame 6 is moved on the optical axis O in the rightward direction together with the guide ring 5 and the connecting ring 10.

At this time, the connecting pin 11 of the cam frame 6 is engaged with each of the connecting grooves 2d of the main moving frame 2 Accordingly, the main moving frame 2 and the cam frame 6 are moved in the rightward direction while the main moving frame 2 and the cam frame 6 are integrally rotated.

The fitting roller 12 is fitted into the cam groove 6a for moving the third lens group formed in a front portion of the cam frame 6 and is simultaneously fitted into the straight groove 5c formed in a front portion of the guide ring 5. Accordingly, when the cam frame 6 is rotated in the normal rotating direction, the fitting roller 12 receives a cam action of the cam groove 6a for moving the third lens group and a straight guide action of the straight groove 5c. Therefore, the moving frame 7 for the third lens group integrated with this fitting roller 12 is straightly moved on the optical axis O in the rightward direction from a position shown by the upper cross-sectional view located above the central line of FIG. 1 to a position shown by the lower cross-sectional view located below the central line of FIG. 1.

The fitting roller 13 is fitted into the cam groove 6b for moving the fourth lens group formed in a rear portion of the cam frame 6 and is also simultaneously fitted into the straight groove 5d formed in a rear portion of the guide ring 5. This fitting roller 13 receives a cam action of the cam groove 6b for moving the fourth lens group and a straight guide action of the straight groove 5d. Therefore, the moving frame 8 for the fourth lens group integrated with this fitting roller 13 is also straightly moved on the optical axis O in the rightward direction from a position shown by the upper cross-sectional view located above the central line of FIG. 1 to a position shown by the lower cross-sectional view located below the central line of FIG. 1.

The fitting roller 14 is fitted into the cam groove 7b for moving the second lens group formed in the moving frame 7 for the third lens group and is simultaneously fitted into the straight groove 6c formed in the cam frame 6. Accordingly, when the cam frame 6 is rotated and the moving frame 7 for the third lens group is straightly moved in the rightward direction, the fitting roller 14 receives a cam action of the cam groove 7b for moving the second lens group and a straight guide action of the straight groove 6c.

Therefore, the moving frame 9 for the second lens group integrated with this fitting roller 14 is moved on the optical axis O in the rightward direction from a position shown by the upper cross-sectional view located above the central line of FIG. 1 to a position shown by the lower cross-sectional view located below the central line of FIG. 1 while the moving frame 9 and the cam frame 6 are integrally rotated.

When the driving gear 21 is thus rotated in the normal rotating direction, each of the frame members 2, 6, 7 to 9 and the rings 5, 10 is moved as follows from a position shown by the upper cross-sectional view located above the central line of FIG. 1 to a position shown by the lower cross-sectional view located below the central line of FIG. 1.

(a) The main moving frame 2 is moved on the optical axis O in the rightward direction while the main moving frame 2 is rotated.

(b) The moved frame 3 as a moving frame for the first lens group is straightly moved on the optical axis O in the rightward direction while no moved frame 3 is rotated.

(c) The guide ring 5 and the connecting ring 10 are straightly moved on the optical axis O in the rightward direction in a state in which the guide ring 5 and the connecting ring 10 are not rotated.

(d) The cam frame 6 is moved on the optical axis O in the rightward direction while the cam frame 6 and the main moving frame 2 are integrally rotated.

(e) The moving frame 7 for the third lens group and the moving frame 8 for the fourth lens group are straightly moved on the optical axis O in the rightward direction in a state in which no moving frames 7 and 8 are rotated.

(f) The moving frame 9 for the second lens group is moved on the optical axis O in the rightward direction while the moving frame 9 and the cam frame 6 are integrally rotated.

As a result, while each of the lens groups $L_1$ to $L_4$ constituting the zooming optical system draws a moving locus shown in FIG. 5, each of the lens groups is moved from a position realizing the focal length $f_T$ at a telescopic end corresponding to a first state length of the lens body tube to a position realizing the focal length $f_W$ at a wide angle end corresponding to a second state length of the lens body tube. The first state length is provided when the lens body tube is longest. The second state length is provided when the length of the lens body tube is reduced by a length corresponding to the zooming region from the first state length.

When the lens groups $L_1$ to $L_4$ of the zooming optical system realize the focal length $f_W$ at the wide angle end and the seesaw type zooming-operating member is operated in a reverse direction for moving the respective lens groups $L_1$ to $L_4$ from the wide angle region to the telescopic region, the general control circuit means controls an operation of the unillustrated zooming motor such that the zooming motor is rotated in the reverse direction. Thus, the driving gear 21 is rotated in the reverse direction.

At this time, in accordance with the reverse rotation of the driving gear 21, each of the frame members 2, 6, 7 to 9 and the rings 5, 10 is moved from a position shown by the lower cross-sectional view located below the central line of FIG. 1 to a position shown by the upper cross-sectional view located above the central line of FIG. 1. Namely, each of the frame members 2, 6, 7 to 9 and the rings 5, 10 is moved in a direction reverse to that described in the above items (a) to (f). Each of the lens groups $L_1$ to $L_4$ is moved in the leftward direction from a position realizing the focal length $f_W$ at the wide angle end to a position realizing the focal length $f_T$ at the telescopic end while each of these lens groups draws a moving locus shown in FIG. 5.

As mentioned above, in this embodiment, the lens groups $L_1$ to $L_4$ of the zooming optical system are moved forward and backward on the optical axis within the zooming region $f_T$ to $f_W$ by operating the seesaw type zooming-operating member in the normal and reverse directions. Thus, the focal length of the zooming optical system is obtained within the zooming region $f_T$ to $f_W$.

In this case, when the lens groups $L_1$ to $L_4$ attain states for realizing the focal length $f_T$ at the telescopic end and the focal length $f_W$ at the wide angle end, each of the moved frame 3 as the moving frame for the first lens group and the moving frames for the second to fourth lens groups is detected by using a suitable position control means such as an electric position detecting means. Information of this electrically detected position is inputted to the general control circuit means. In this construction, the zooming optical system is constructed in advance such that the operation of the zooming motor is stopped in positions or phases corresponding to the focal length $f_T$ at the telescopic end and the focal length $f_W$ at the wide angle end.

In a process for moving the lens groups $L_1$ to $L_4$ forward and backward on the optical axis O within the zooming region $f_T$ to $f_W$, the moving frame 9 for the second lens group is relatively rotated by a certain angle within the moving frame for the third lens group with respect to this moving frame 7. This angle corresponds to a circumferential length of the cam groove 7b for moving the second lens group. Thus, the bevel cam 35a of the S-WIDE switching piece 35 approaches the acting pin 33 on the converter lens arm 31. In this embodiment, relative positions of both the members 33 and 35 are set in advance such that no members 33 and 35 come in contact with each other at this relative rotational angle.

Accordingly, the approaching state of the bevel cam 35a of the S-WIDE switching piece 35 and the acting pin 33 is held as it is within the zooming region from $f_T$ to $f_W$.

[Focusing operations and actions]

For example, a focusing operation of the above lens body tube is performed by rotating the focusing motor 24 in the normal and reverse directions on the basis of a photographing distance control signal from an unillustrated automatic focusing control means.

In this embodiment, for example, the automatic focusing control means measures the distance of a photographed object at this time and outputs the photographing distance control signal conformed to this distance of the photographed object to the general control circuit means. Accordingly, the general control circuit means calculates a rotating amount of the focusing motor 24 according to this photographing distance control signal and outputs the calculated results to the focusing motor driving circuit means.

Accordingly, the focusing motor 24 is rotated in the normal or reverse direction by the rotating amount commanded from the focusing motor driving circuit means. As shown by the upper cross-sectional view located above the central line of FIG. 2 and a partial plan view shown in FIG. 9, rotational force of the focusing motor 24 at this time is transmitted from the output gear 25 fixed to an output shaft of the focusing motor 24 to the small gear 27 at a final stage through the reduction gear series 26. Further, this rotational force of the focusing motor 24 is further transmitted from this small gear 27 to the inner gear portion 15b of the focusing ring 15. For example, the focusing ring 15 is rotated in the normal direction by an amount according to the calculated results of the general control circuit means within the moving frame 8 for the fourth lens group with respect to this moving frame 8.

At this time, the connecting pin 17 attached to the holding frame 16 of the fourth lens group is simultaneously fitted into the focusing cam groove 15a of the focusing ring 15 and the straight groove 8c of the moving frame 8 for the fourth lens group. Therefore, for example, the connecting pin 17 and the holding frame 16 of the fourth lens group integrated with the connecting pin 17 are straightly moved toward the film face F by a cam action of the focusing cam groove 15a acting with respect to the connecting pin 17 and an antirotation action of the straight groove 8c.

Namely, in accordance with the rotation of the focusing ring 15, the holding frame 16 of the fourth lens group is moved in the rightward direction by an amount determined by the calculated results of the general control circuit means at this time and a shape of the focusing cam groove 15a. Thus, the holding frame 16 of the fourth lens group reaches a position shown by $L_4'$ in FIG. 5 so that a focusing operation suitable for the photographed object distance at this time is performed.

Such a focusing operation can be performed at any time within the zooming region $f_T$ to $f_W$ of the lens groups $L_1$ to $L_4$ of the zooming optical system at an inserting time of the converter lens Lc described later.

[Operations and actions at a switching time of a focal length $f_{S-W}$ from the zooming region $f_T$ to $f_W$ to an S-wide angle region]

As mentioned above, in the present invention, a specified focal length such as a super short focal length $f_{S-W}$ in the S-wide angle region unable to be obtained by the zooming operation in the normal zooming region $f_T$ to $f_W$ can be obtained by inserting the converter lens Lc into the lens body tube in a predetermined acting position set on the optical axis O.

In this case, the seesaw type zooming-operating member in this embodiment is further operated in the normal direction in a state in which each of the lens groups $L_1$ to $L_4$ of the zooming optical system is located in a position for realizing the focal length $f_W$ at the wide angle end.

The main moving frame 2 is stopped in a position shown by the lower cross-sectional view located below the central line of FIG. 1. This position is a position providing the focal length $f_W$ at the wide angle end. When the zooming motor is rotated in the normal direction by operating the seesaw type zooming-operating member in the normal direction, the main moving frame 2 stopped in this position is moved in the rightward direction while the main moving frame 2 is further rotated by an engaging action of the driving gear 21 and the gear portion 2b of the main moving frame 2. Thus, the guide ring 5 and the connecting ring 10 are straightly moved in the rightward direction. Further, the cam frame 6 is moved in the rightward direction while the cam frame 6 and the main moving frame 2 are integrally rotated.

In this case, in this embodiment, a shape of the cam groove 6a for moving the third lens group formed in the cam frame 6, a shape of the cam groove 6b for moving the fourth lens group and a shape of the cam groove 7b for moving the second lens group formed in the moving frame 7 for the third lens group ape formed in parallel with each other in a region or range from positions providing the focal length $f_W$ at the wide angle end to the film face F. Accordingly, each of the lens groups $L_1$ to $L_4$ is moved to a position shown by the upper cross-sectional view located above the central line of FIG. 2 without changing any relative positions. This position is a position for realizing the focal length $f_{S-W}$ in an S-wide angle end.

At this time, a moving method of each of the moving frames 3, 7 to 9 is similar to that of each of the moving frames 3, 7 to 9 within the zooming region from $f_T$ to $f_W$. In this case, for example, a cam amount or length in a parallel cam state is set to be equal to a leading amount of each of the lead grooves 2c of the main moving frame 2 so as not to change distances between the four lens group moving frames 3, 7 to 9 on the optical axis.

Each of the moving frames 3 and 7 to 9 is moved from a position for realizing the focal length $f_W$ at the wide angle end corresponding to the second state length of the lens body tube to a position for realizing the focal length $f_{S-W}$ at the S-wide angle end. This position for realizing the focal length $f_{S-W}$ corresponds to a third state length of the lens body tube provided when the length of the lens body tube is further reduced from the second state length. The moving frame 9 for the second lens group is relatively rotated with respect to the moving frame 7 for the third lens group in a moving process of each of the moving frames 3 and 7 to 9. In the position realizing the focal length $f_W$ at the wide angle end, the bevel cam 35a of the S-WIDE switching piece 35 is located in a position close to the acting pin 33 on the converter lens arm 31. This bevel cam 35a comes in contact with the acting pin 33 on the converter lens arm 31 by the above relative rotation of the moving frame 9. Further, the bevel cam 35a rotates the converter lens arm 31 around the pivotal shaft 32 in the clockwise direction in FIG. 3 against biasing force of the return spring 34.

Therefore, the converter lens arm 31 is greatly rotated from the escaping position shown in FIG. 3 in the clockwise direction in FIG. 3. When the moving frame 9 for the second lens group is further relatively rotated, the arc cam 35b of the S-WIDE switching piece 35 comes in contact with a face of the acting pin 33 closer to the optical axis O. Thus, the arc cam 35b fixedly holds the acting pin 33 in a rotational position as shown in FIG. 4.

Accordingly, the converter lens arm 31 has reached an acting position on the optical axis O and is stopped in this acting position. At this time, the converter lens Lc is inserted into the lens body tube in the predetermined acting position. Thus, the converter lens Lc realizes the focal length $f_{S-W}$ at the S-wide angle end in cooperation with the lens groups $L_1$ to $L_4$ of the zooming optical system located in corresponding positions for realizing the focal length $f_W$ at the wide angle end.

In this case, relative rotating amounts of the moving frame 9 for the second lens group and the moving frame 7 for the third lens group are set in this embodiment such that the arc cam 35b of the S-WIDE switching piece 35 and the acting pin 33 on the converter lens arm 31 have the above relation.

When the converter lens Lc is inserted into the lens body tube in the predetermined acting position, this inserting state is detected by using a suitable posture control means such as an electric posture detecting means. Information of this electric detection is inputted to the general control circuit means. In this construction, the zooming optical system is constructed in advance such that the operation of the zooming motor is stopped in a position or phase corresponding to the position realizing the focal length $f_{S-W}$ at the S-wide angle end.

[Operations and actions at a storing time of the lens body tube]

As mentioned above, in the present invention, the lens body tube can be stored until a position providing a shortest length as a fourth state length of the lens body tube when no lens body tube is used.

In this case, the seesaw type zooming-operating member in this embodiment is further operated in the normal direction in a state in which each of the lens groups $L_1$ to $L_4$ of the zooming optical system is located in the position realizing the focal length $f_{S-W}$ at the S-wide angle end and providing the third state length.

The main moving frame 2 is stopped in a position shown by the upper cross-sectional view located above the central line of FIG. 2. This position is a position providing the focal length $f_{S-W}$ at the S-wide angle end. When the zooming motor is rotated in the normal direction by operating the seesaw type zooming-operating member in the normal direction, the main moving frame 2 stopped in the above position is moved (or drawn in) in the rightward direction while the main moving frame 2 is further rotated by the engaging action of the driving gear 21 and the gear portion 2b of the main moving frame 2. Thus, the guide ring 5 and the connecting ring 10 are straightly moved in the rightward direction. Further, the cam frame 6 is moved in the rightward direction while the cam frame 6 and the main moving frame 2 are integrally rotated.

In this embodiment, the rightward movement of the main moving frame 2 is stopped in a position in which the driving gear 21 has reached one end portion of the gear portion 2b of the main moving frame 2 in the optical axis direction. This one end portion of the gear portion 2b is an end portion on the side of a photographed object. Each of the moving frames 3 and 7 to 9 is continuously moved while the main moving frame 2 is moved to this position from the position providing the focal length $f_{S-W}$ at the S-wide angle end and corresponding to the third state length. A moving method of each of the moving frames 3 and 7 to 9 is similar to that within the zooming region from $f_T$ to $f_W$. This moving method of each of the moving frames 3 and 7 to 9 is also similar to that from the position realizing the focal length $f_W$ at the wide angle end to the position realizing the focal length $f_{S-W}$ at the S-wide angle end.

In this case, in this embodiment, a shape of the cam groove 6a for moving the third lens group formed in the cam frame 6, a shape of the cam groove 6b for moving the fourth lens group and a shape of the cam groove 7b for moving the second lens group formed in the moving frame 7 for the third lens group are formed in parallel with each other in a region or range from the position realizing the focal length $f_{S-W}$ at the S-wide angle end to the film face F. These cam shapes are similar to those provided in the above-mentioned case in which each of the lens groups is moved from the position providing the focal length $f_W$ at the wide angle end to the position providing the focal length $f_{S-W}$ at the S-wide angle end. Accordingly, each of the lens groups $L_1$ to $L_4$ is moved in the rightward direction without changing any relative positions until the main moving frame 2 is stopped.

When the main moving frame 2 is stopped, the rightward movement of each of the moving frames 3 and 7 to 9 is stopped. Namely, each of the moving frames 3 and 7 to 9 is stopped in a position shown by the lower cross-sectional view located below the central line of FIG. 2. This position is a storing state position corresponding to the fourth state length of the lens body tube.

In this embodiment, relative rotating amounts of the moving frame 9 for the second lens group and the moving frame 7 for the third lens group are set such that the arc cam 35b of the S-WIDE switching piece 35 can hold a position of the acting pin 33 on the converter lens arm 31 from the position realizing the focal length $f_{S-W}$ at the S-wide angle end to the storing state position.

Further, in this embodiment, the zooming optical system is constructed in advance such that the rotation of the zooming motor is stopped in a position in which the driving gear 21 has reached one end portion of the gear portion 2b of the main moving frame 2 in the optical axis direction. However, the rotation of the zooming motor can be stopped before the driving gear 21 has reached one end portion of the gear portion 2b of the main moving frame 2 in the optical axis direction.

[Operations and actions at a switching time of a focal length $f_{T-M}$ at a macroscopic time from the zooming region $f_T$ to $f_W$]

In this embodiment, for example, a super long focal length $f_{T-M}$ as a focal length at a macroscopic time can be obtained. This focal length $f_{T-M}$ cannot be obtained by the zooming operation in the normal zooming region from $f_T$ to $f_W$.

In this case, the seesaw type zooming-operating member in this embodiment is further operated in the reverse direction in a state in which each of the lens groups $L_1$ to $L_4$ of the zooming optical system is located in a position for realizing the focal length $f_T$ at the telescopic end.

In movement of each of the lens groups $L_1$ to $L_4$ of the zooming optical system, the rotational direction of the zooming motor is changed from the normal direction to the reverse direction. Further, a moving direction of the main moving frame 2 is changed from the rightward direction to the leftward direction directed to a photographed object. Operations and actions of the lens body tube in this case are similar to those at the storing time of the lens body tube. Accordingly, for brevity, a detailed explanation of these operations and actions is omitted in the following description.

In this embodiment, the three cam grooves 7b, 6a and 6b for moving the respective lens group moving frames 3 and 7 to 9 are formed such that the fitting rollers 12, 13 and 14 moved along the respective cam grooves can be continuously moved from a position for providing the focal length $f_{T-M}$ at the macroscopic time to the storing state position of the lens body tube through a position for providing a focal length within the zooming region $f_T$ to $f_W$ and a position for providing the focal length $f_{S-W}$ at the S-wide angle end.

Further, in this embodiment, as mentioned above, relative rotational angles of the moving frame 9 for the second lens group and the moving frame 7 for the third lens group are set as follows.

(a) When the moving frame 9 for the second lens group and the moving frame 7 for the third lens group are relatively rotated within the zooming region from $f_T$ to $f_W$, the bevel cam 35a of the S-WIDE switching piece 35 and the acting pin are set such that the bevel cam 35a and the acting pin 33 do not come in contact with each other.

(b) The bevel cam 35a of the S-WIDE switching piece 35 and the acting pin 33 come in contact with each other while the moving frame 9 for the second lens group and the moving frame 7 for the third lens group are relatively rotated from a position providing the focal length $f_W$ at the wide angle end to a position providing the focal length $f_{S-W}$ at the S-wide angle end. The converter lens arm 31 is rotated by this contact from the escaping position to the acting position. Further, the acting pin 33 can be held by the arc cam 35b of the S-WIDE switching piece (c) While the moving frame 9 for the second lens group and the moving frame 7 for the third lens group are relatively rotated from the position providing the focal length $f_{S-W}$ at the S-wide angle end to the storing state position, the arc cam 35b of the S-WIDE switching piece 35 continuously holds the acting pin 33 on the converter lens arm 31.

The present invention is not limited to the above-mentioned plural embodiments, but can be changed in various kinds of modifications within the features of the present invention.

For example, the storing state position of the lens body tube in this embodiment is set on an extension exceeding the position providing the focal length $f_{S-W}$ at the S-wide angle end. However, the storing state position of the lens body tube can be set on an extension exceeding the position providing the focal length $f_{T-M}$ at the macroscopic time.

No structure for moving each of the lens group moving frames along the optical axis is limited to the structure shown in the drawings, but can be constructed by using a well-known suitable structure.

Further, no focusing system and structure are not limited to these shown in the drawings.

A photographing screen frame can be changed from a frame for a standard screen to a frame for a so-called panoramic screen in association with a switching operation of the converter lens Lc from the escaping position to the acting position.

Namely, a shield plate 36 is arranged to symmetrically shield upper and lower portions of the standard screen frame formed in a camera body to form the panoramic screen frame. This shield plate is arranged such that the shield plate can be slid or rotated between an escaping position and an advancing position with respect to the standard screen frame.

An inserting operation of the converter lens Lc into the zooming optical system, i.e., a rotating operation of the converter lens arm 31 is transmitted to the shield plate through a member for transmitting the inserting and rotating operations onto the camera side. This shield plate is rotated or slid so that the shield plate is moved into each of the upper and lower portions of the standard screen frame from the escaping position, thereby forming the panoramic screen frame.

When such a structure is used, it is possible to take grand and powerful photographs at a super wide angle and a super transversal screen size so that practical value of the photographs can be greatly improved.

As mentioned above, in accordance with a first structure of the present invention, a lens body tube has one lens group moving means for relatively moving a plurality of lens groups. The plural lens groups moved by this lens group moving means are divided into at least one rotating-moving lens group and a straight moving lens group. When the lens group moving means is rotated in a predetermined direction, the rotating-moving lens group is moved on an optical axis while the rotating-moving lens group is rotated around the optical axis. When the lens group moving means is rotated in the predetermined direction, the straight moving lens group is straightly moved on the optical axis while no straight moving lens group is rotated.

When a specified focal length unable to be obtained within a normal zooming region of a zooming optical system is realized, a relative rotating movement is caused between the rotating-moving lens group and the straight moving lens group by using an operation of the lens group moving means set on an extension of an operation of the lens group moving means for realizing a focal length in the zooming region. A converter lens is inserted into a predetermined position of the zooming optical system by this relative rotating movement so as to obtain the specified focal length. Accordingly, it is possible to provide a lens body tube with a built-in converter lens having the following various kinds of effects.

(i) Driving force of an electric motor for moving each of the moving lens groups constituting the zooming optical system can be used as it is without using any dedicated electric driving means for driving force applied when the converter lens is attached and detached from the lens body tube.

(ii) It is not necessary to especially arrange a complicated electric control means for attaching and detaching the converter lens.

(iii) A mechanical member arranged in a normal zoom lens is used as much as possible as a mechanical moving means used when the converter lens is attached and detached. Some peculiar members are added to this mechanical member. Accordingly, the lens body tube is simply constructed and has a strong structure and cost the lens body tube can be reduced.

(iv) It is not necessary to especially increase a diameter and a length of the lens body tube.

In particular, when a position for attaching and detaching the converter lens is set to an intermediate position of the zooming optical system, an area for an effective light beam is smallest so that the converter lens can be made compact. Further, a shutter is arranged in this intermediate position and a dead space for completely opening blades of this shutter is formed. Accordingly, the converter lens and a mechanism for attaching and detaching the converter lens can be arranged in this dead space so that the dead space can be effectively utilized.

(v) No dedicated operating member is arranged when the specified focal length is realized and the length of the lens body tube is reduced. Further, the specified focal length can be realized by an operation continuously connected to the normal zooming operation.

In a fifth structure of the present invention, a lens body tube with a built-in converter lens is constructed such that the length of the lens body tube can be reduced to a length providing a storing state. Further, a position for detachably inserting the converter lens is set to an arbitrary position between one limit position in the normal zooming region of the zooming optical system and a position for providing the body tube length in the storing state of the lens body tube. Accordingly, the converter lens is detachably inserted into the zooming optical system to change its focal length while the plural lens groups are relatively moved on the optical axis. Thus, it is possible to realize a specified focal length which cannot be obtained within the zooming region of the zooming optical system. Further, the length of the lens body tube can be reduced when no lens body tube is used.

Many widely different embodiments of the present invention may be constructed without departing from the spirit and scope of the present invention. It should be understood that the present invention is not limited to the specific embodiments described in the specification, except as defined in the appended claims.

What is claimed is:

1. A lens body tube comprising:
    a built-in converter lens in which a focal length is obtained by detachably inserting the converter lens into a built-in zooming optical system to change its focal length while a plurality of lens groups are relatively moved along an optical axis of the zooming optical system;
    a single lens group moving means for relatively moving said plurality of lens group;
    said plurality of lens groups constituting said zooming optical system and including:
    at least one rotating-moving lens group which is rotated around said optical axis when said lens group moving means is rotated in a predetermined direction; and
    a straight moving lens group which is moved along said optical axis;
    said converter lens being inserted into said zooming optical system from an escaping position to an acting position, said escaping position being located in said lens body tube;
    a length of said lens body tube being sequentially changed in an order of a first state length, a second state length, a third state length and a fourth state length;
    the first state length being longest and providing a focal length of each of said plurality of lens groups at a first end of a zooming region of said zooming optical system by rotating said lens group moving means in said predetermined direction;
    the second state length being a second longest length and providing a focal length of each of said plurality of lens groups at a second end of the zooming region of said zooming optical system by subsequently rotating said lens group moving means;
    the third state length being a third longest length set by subsequently rotating said lens group moving means; and
    the fourth state length being a shortest focal length set by subsequently rotating said lens group moving means;
    the lens body tube being constructed such that a focal length unable to be obtained within the zooming region of the zooming optical system is obtained by detachably inserting said converter lens via a relative rotating movement caused between said rotating-moving lens group and said straight moving lens group, except during a changing process from said first state length to said third state length, wherein a frame body for holding said converter lens is pivotally supported by a pivotal shaft arranged on a ground plate of a shutter unit which is fixedly attached to said frame body for holding the straight moving lens group opposite to said rotating-moving lens group.

2. A lens body tube comprising:
    a built-in converter lens in which a focal length is obtained by detachably inserting the converter lens into a built-in zooming optical system to change its focal length while a plurality of lens groups are relatively moved along an optical axis of the zooming optical system;
    a single lens group moving means for relatively moving said plurality of lens groups;
    said plurality of lens groups constituting said zooming optical system and including:
    at least one rotating-moving lens group which is rotated around said optical axis when said lens group moving means is rotating in a predetermined direction; and
    a straight moving lens group which is moved along said optical axis;
    said converter lens being inserted into said zooming optical system from an escaping position to an acting position, said escaping position being located in said lens body tube;
    a length of said lens body tube being sequentially changed in an order of a first state length, a second state length, a third state length and a fourth state length;
    the first state length being longest and providing a focal length of each of said plurality of lens groups at a first end of a zooming region of said zooming optical system by rotating said lens group moving means in said predetermined direction;
    the second state length being a second longest length and providing a focal length of each of said plurality of lens groups at a second end of the zooming region of said zooming optical system by subsequently rotating said lens group moving means;
    the third state length being a third longest length set by subsequently rotating said lens group moving means; and
    the fourth state length being a shortest focal length set by subsequently rotating said lens group moving means;
    the lens body tube being constructed such that a focal length unable to be obtained within the zooming region of the zooming optical system is obtained by detachably inserting said converter lens via a relative rotating movement caused between said rotating-moving lens group and said straight moving lens group, except during a changing process from said first state length to said third state length, wherein a shield plate shields upper and lower portions of a frame for a standard screen formed in a camera body to form a frame for a panoramic screen;
    the shield plate being arranged such that the shield plate can be moved into and out of said standard screen frame; and
    said panoramic screen frame being formed by moving said shield plate from an escaping position into said standard screen frame in association with the inserting operation of said converter lens into said zooming optical system.

3. A lens body tube with a built-in converter lens in which a focal length is obtained by detachably inserting the converter lens into a built-in zooming optical system to change its focal length while a plurality of lens groups are relatively moved along an optical axis of the zooming optical system;

said plurality of lens groups are relatively moved by reciprocating the lens group moving means;

the plurality of the lens groups constituting said zooming optical system further approach each other by operating said lens group moving means in a single direction in comparison with relative distances of the plurality of lens groups along the optical axis when said focal point is realized; and a length of the lens body tube is then set to a length for storing when no lens body tube is used, wherein a lens group of said plurality of lens groups closest to a film face is set to a lens group for focusing;

focusing-moving means for moving said lens group for focusing is arranged within said lens body tube;

a spatial portion is formed in a frame body for holding a first lens group and positioning said first lens group on the side of a photographed object and opposite to said lens group for focusing; and the spatial portion stores a member relative to said focusing-moving means when the length of the lens body tube is reduced to said given length at a nonuse time.

4. A lens body tube with a built-in converter lens in which a focal length is obtained by detachably inserting the converter lens into a built-in zooming optical system to change its focal length while a plurality of lens groups are relatively moved along an optical axis of the zooming optical system;

said plurality of lens groups are relatively moved by reciprocating the lens group moving means;

the plurality of lens groups constituting said zooming optical system further approach each other by operating said lens group moving means in a single direction in comparison with relative distances of the plurality of lens groups along the optical axis when said focal point is realized; and a length of the lens body tube is then set to a length for storing when no lens body tube is used, wherein a shield plate shields upper and lower portions of a frame for a standard screen formed in a camera body to form a frame for a panoramic screen;

the shield plate being arranged such that the shield plate can be moved into and out of said standard screen frame; and said panoramic screen frame being formed by moving said shield plate from an escaping position into said standard screen frame in association with the inserting operation of said converter lens into said zooming optical system.

* * * * *